(12) United States Patent
Caps

(10) Patent No.: US 11,535,443 B2
(45) Date of Patent: Dec. 27, 2022

(54) INSERT HOLDER FOR A SHIPPING CARRIER

(71) Applicant: va-Q-tec AG, Würzburg (DE)

(72) Inventor: Roland Caps, Kleinwallstadt (DE)

(73) Assignee: va-Q-tec AG, Würzburg (DE)

( * ) Notice: Subject to any disclaimer, the term of this patent is extended or adjusted under 35 U.S.C. 154(b) by 49 days.

(21) Appl. No.: 17/027,310

(22) Filed: Sep. 21, 2020

(65) Prior Publication Data

US 2021/0086980 A1    Mar. 25, 2021

(51) Int. Cl.
| | |
|---|---|
| B65D 81/38 | (2006.01) |
| B32B 1/02 | (2006.01) |
| B32B 5/18 | (2006.01) |
| B32B 5/32 | (2006.01) |
| B65D 1/22 | (2006.01) |
| B65D 25/34 | (2006.01) |
| B65D 43/12 | (2006.01) |

(52) U.S. Cl.
CPC ............ *B65D 81/3816* (2013.01); *B32B 1/02* (2013.01); *B32B 5/18* (2013.01); *B32B 5/32* (2013.01); *B65D 1/22* (2013.01); *B65D 25/34* (2013.01); *B65D 43/12* (2013.01); *B32B 2250/22* (2013.01); *B32B 2266/025* (2013.01); *B32B 2307/304* (2013.01); *B32B 2439/00* (2013.01)

(58) Field of Classification Search
None
See application file for complete search history.

(56) References Cited

U.S. PATENT DOCUMENTS

| | | | |
|---|---|---|---|
| 10,329,074 B2 | 6/2019 | Ranade et al. | |
| 2004/0031794 A1* | 2/2004 | Bucher | B65D 90/022 220/4.01 |
| 2004/0180176 A1* | 9/2004 | Rusek, Jr. | B32B 5/245 428/69 |
| 2008/0292220 A1* | 11/2008 | Zacchi | F25D 3/14 220/592.2 |
| 2016/0059448 A1* | 3/2016 | Ranade | B65D 81/3816 264/250 |
| 2016/0185068 A1* | 6/2016 | Shinohara | B32B 3/08 156/60 |

FOREIGN PATENT DOCUMENTS

| | | | | |
|---|---|---|---|---|
| EP | 2022727 A1 * | 2/2009 | ......... | B65D 81/3858 |
| WO | 2014118821 A1 | 8/2014 | | |

* cited by examiner

*Primary Examiner* — Chinessa T. Golden
(74) *Attorney, Agent, or Firm* — Mark Terry

(57) ABSTRACT

Insert container for a shipment carrier, which insert container comprises at least one side wall and a bottom, which enclose a receiving space which can be closed with a lid, the at least one side wall and/or the bottom having a multilayer wall structure comprising at least one layer of at least one vacuum insulation panel and at least one layer of a particle foam, such as in particular expanded polypropylene (EPP), and wherein the at least one layer of particle foam is formed at each point with a thickness in the range from 2 mm to 12 mm.

15 Claims, 3 Drawing Sheets

INSERT HOLDER FOR A SHIPPING CARRIER

CROSS-REFERENCE TO RELATED APPLICATIONS

This patent application claims priority to German utility patent application number 20 2019 105 203.1 filed Sep. 19, 2019 and titled "Insert Container For A Shipment Carrier". The subject matter of patent application number 20 2019 105 203.1 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND

Shipment carriers are known, for example, in the form of small item carriers or as boxes, barrels, trays or skeleton containers into which an insert container made of foamed plastics is inserted.

Insert containers of this generic type are preferably made of a particle foam, such as in particular expanded polypropylene (EPP). This material is characterized by a low density and, in this connection, by hence easily producible lightweight components. Expanded polypropylene (EPP) also has the advantage of exhibiting good thermal insulation properties, so that the use of transport containers produced therefrom for the transport of temperature-sensitive goods, for example in the form of cooling boxes, is widespread.

With conventional transport boxes, for example for wholesalers, it is known to provide a carrier in the form of a logistics container into which a heat-insulating insert container is inserted. The insert container consists of a layer of vacuum insulation panel surrounded by a particle foam, such as in particular expanded polypropylene (EPP). Due to the high requirements placed on robustness during transport of the container, special properties are required regarding the foamed material. For this purpose, is known that in the production of a particle foam, such as in particular expanded polypropylene (EPP), the wall thicknesses should be dimensioned to measure 4 cm or more in order to attain sufficient strength for the foamed material.

Conventional transport boxes are known in the prior art from U.S. Pat. No. 10,329,074 B2 and WO 2014/118 821 A1.

A disadvantage of insert containers produced in this way is that the foamed insert takes up a large volume. Especially when vacuum insulation panels are used in the production of insert containers, the advantage of thin wall thicknesses with simultaneously excellent insulation properties is achieved, so that, in connection with insert containers of this generic type, as few particle foam as possible, such as in particular expanded polypropylene (EPP), should desirably contribute to the wall thickness, because in this way overall thin thicknesses can be realized.

SUMMARY

The present invention relates to insert containers for a shipment carrier according to the independent claim.

It is the object of the invention to provide an insert container for a shipment carrier which overcomes the disadvantages of prior art and which specifically enables a maximum reception volume.

The object is accomplished by an insert container for a shipment carrier according to the independent claim. Advantageous embodiments are the subject-matter of the respective subclaims.

The invention encompasses an insert container for a shipment carrier. The insert container comprises at least one side wall (preferably four side walls) and/or a bottom. The at least one side wall and the bottom enclose a receiving space (for the items to be transported) which can be closed with a lid. The at least one side wall and/or the bottom have a multilayer wall structure comprising at least one layer of at least one vacuum insulation panel (respectively areal vacuum insulation element of corresponding geometry) and at least one layer of a particle foam, such as in particular expanded polypropylene (EPP). The layer of a particle foam, such as in particular expanded polypropylene (EPP), is formed at each point with a thickness in the range of 2 mm to 12 mm.

The outstanding feature of the invention is the low thickness in the surface. Due to the reduced thickness of the layer of a particle foam, such as in particular expanded polypropylene (EPP), compared to prior art, an insert container for a shipment carrier can be provided, in which the total wall thickness is reduced and the reception volume is correspondingly larger. This makes it also possible to realize a favorable weight reduction.

DETAILED DESCRIPTION

Figure 1:
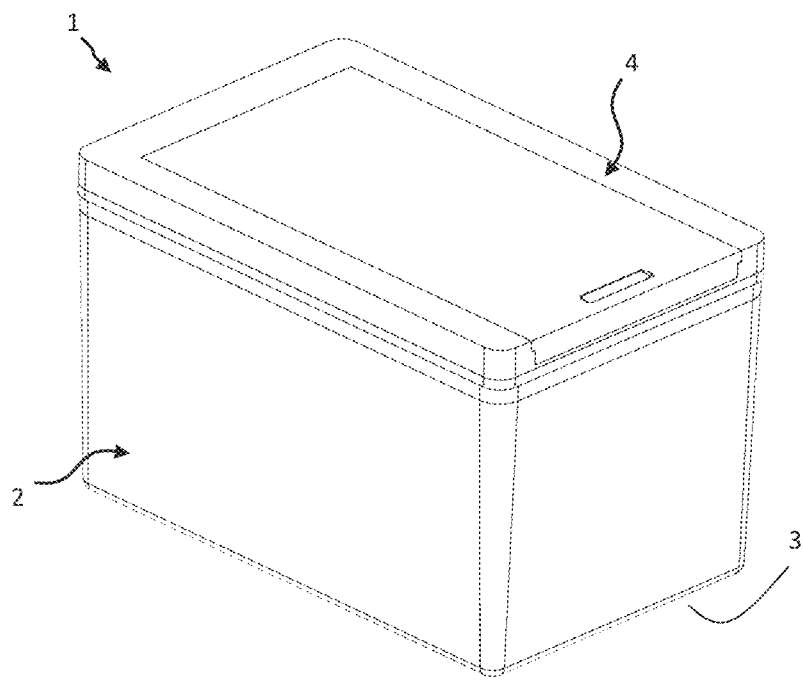
FIG. 1 shows a schematic perspective view of an insert container according to an exemplary embodiment of the invention.

In accordance with an advantageous aspect, the layer is made of a particle foam, such as in particular expanded polypropylene (EPP), in a surface portion of the side wall and/or the bottom in the range of 50% to 90% of the total surface area with a thickness in the range of 2 mm to 12 mm. These wall thicknesses allow mechanical protection of the layer of vacuum insulation panel when small total wall thicknesses are given.

It is advantageous if the layer is made of a particle foam, such as expanded polypropylene (EPP), with a thickness in the range of 5 mm to 10 mm. These areas are particularly suitable for good quality production.

According to a technically advantageous aspect, the layer of a vacuum insulation panel has a thickness in the range of 5 mm to 30 mm, especially in the range of 5 to 12 mm. The advantageous areas result from the particularly advantageous insulating properties of the vacuum insulation panels.

It is also preferable for the layer of a vacuum insulation panel to include a one-piece folding panel, as this prevents the formation of thermal bridges as much as possible, thus minimizing heat or cold losses.

It is particularly advantageous if the layer of a vacuum insulation panel includes an IR opacifier. In this way, particularly thin-walled insert containers can be produced, especially if the layer of a vacuum insulation panel using the IR opacifier and the layer of a particle foam, such as in particular expanded polypropylene (EPP), are simultaneously kept as small as possible. The IR opacifier has a very low density, <3.5 g/cm$^3$ for solids and <1.9 g/cm for bulk material.

In accordance with a particularly advantageous aspect, the layer of a vacuum insulation panel and the layer of a particle foam, such as in particular expanded polypropylene (EPP), are integrally joined to each other. This can be carried out, for example, by foaming-in the vacuum insulation panel with the particle foam, such as in particular expanded polypropylene (EPP), during production when the foam adheres to the surface of the panel.

Advantageously, the layer of a vacuum insulation panel and the layer of a particle foam, such as in particular expanded polypropylene (EPP), are joined to each other in such a way that the vacuum insulation panel at least in sections is foamed-in with the particle foam, such as in particular expanded polypropylene (EPP). Hence, insert containers can be produced in which the layer of a vacuum insulation panel is covered on at least one side by the particle foam, such as in particular expanded polypropylene (EPP).

Another advantageous aspect is that the layer of a vacuum insulation panel is completely foamed-in by a first layer of a particle foam, such as in particular expanded polypropylene (EPP), and a second layer of a particle foam, such as in particular expanded polypropylene (EPP). The first layer of a particle foam, such as in particular expanded polypropylene (EPP), can be formed by a trough (Inliner) which is inserted into a second layer of a particle foam, such as in particular expanded polypropylene (EPP) in the form of an outer trough. The two troughs are so different in size that the layer of vacuum insulation panel can be inserted between them.

Particularly preferably, the insert container further comprises a lid for closing the receiving space, which has a multilayer wall structure comprising at least one layer of at least one vacuum insulation panel and at least one layer of a particle foam, such as in particular expanded polypropylene (EPP), and wherein the at least one layer of a particle foam, such as in particular expanded polypropylene (EPP), is formed at each point (respectively in the range of 50% to 90% of the total surface area) with a thickness in the range of 2 mm to 12 mm.

Another preferred aspect is that the lid can be opened at least in sections by a sliding element in such a way that a compartment being open in sections for dry ice or for another phase-changing material is formed.

Advantageously, the lid comprises a projection which is arranged in such a way to prevent it from being pulled out completely.

Another aspect of the invention relates to transport containers comprising an insert container as described herein.

In the following, the invention will be explained in more detail using the examples shown in the attached drawings. Identical reference signs refer to identical features in all figures.

Figure 2:
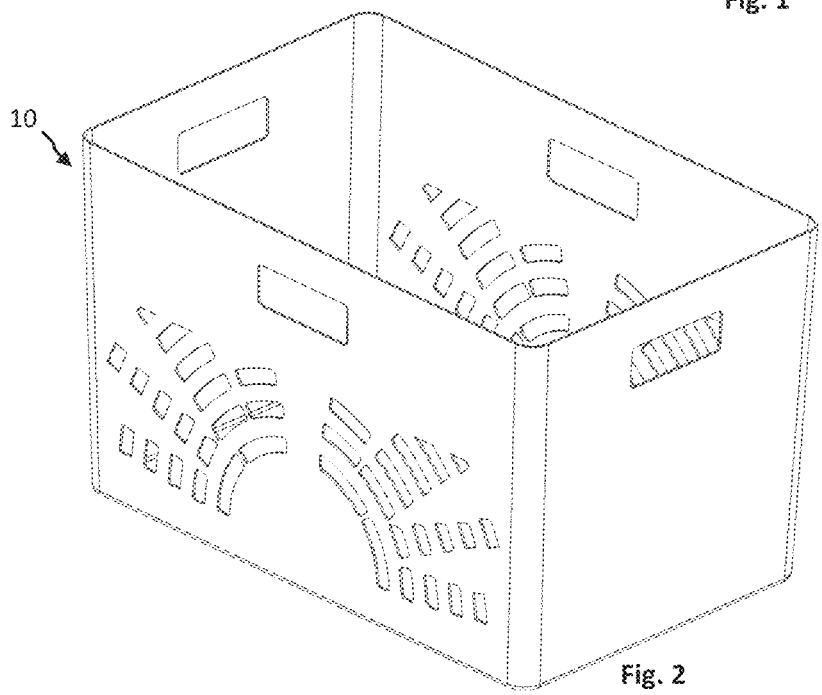
FIG. 2 shows a schematic perspective view of a shipment carrier into which the insert container of FIG. 1 can be inserted.

FIG. 1 is a schematic perspective view of an insert container 1 according to a preferred exemplary embodiment of the invention, wherein in particular the external shape can be adapted according to the shipment carrier (see FIG. 2, reference number 10).

The external contour of the insert container 1 thereby corresponds to the internal contour of the shipment carrier.

The insert container 1 has four side walls 2 which are formed in one piece with the bottom 3. The receiving space formed by side walls 2 and bottom 3 (see FIG. 3, reference number 5) is closed by a lid 4.

Figure 3:
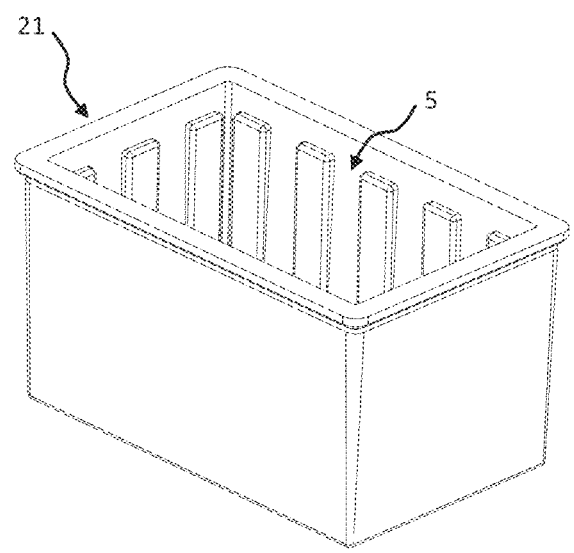
FIG. 3 shows a schematic perspective view of a layer of a particle foam material, such as in particular expanded polypropylene (EPP), which is an inner trough.
Figure 4:
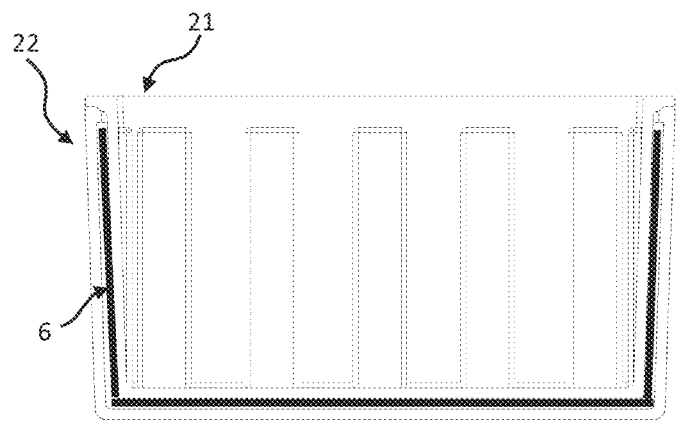
FIG. 4 shows a lateral sectional view of the insert container in which a layer of vacuum insulation panel is disposed.

The advantages of the invention in the example shown result from that side wall 2 and bottom 3 have a multilayer wall structure comprising a layer of a vacuum insulation panel (see FIG. 4, reference number 6) and at least one layer of a particle foam, such as in particular expanded polypropylene (EPP) (FIG. 3 and FIG. 4, reference numbers 21, 22). In this context, the at least one layer of a particle foam, such as in particular expanded polypropylene (EPP), is formed with a thickness in the range of 2 mm to 12 mm.

The insert container 1 is arranged above the shipment carrier 10 shown in FIG. 2 in such a way that it can be inserted from above into the opening of the shipment carrier 10.

In FIG. 3, an inner trough 21 of a layer of a particle foam, such as in particular expanded polypropylene (EPP), is shown in a lateral perspective view.

In this example of an insert container, the layer of a vacuum insulation panel (cf. FIG. 4) is completely foamed-in by a first layer of a particle foam, such as in particular expanded polypropylene (EPP) (see FIG. 4, reference number 21) and a second layer of a particle foam, such as in particular expanded polypropylene (EPP) (see FIG. 4, reference number 21), respectively disposed between separately foamed inner trough 21 as a layer of a particle foam, such as in particular expanded polypropylene (EPP), and outer trough (see FIG. 5, reference number 22) as a separate layer of a particle foam, such as in particular expanded polypropylene (EPP).

The inner trough 21 comprises the receiving space 5.

The insert container is shown in FIG. 4 in a sectional side view. The at least one layer of a particle foam, such as in particular expanded polypropylene (EPP) 21, is formed at each point (at least wall and bottom) in the troughs 21, 22 shown with a thickness of 2 mm to 12 mm.

The illustration also shows the layer of a vacuum insulation panel 6, which has a thickness of 8 mm to 10 mm. The vacuum insulation panel 6 is a one-piece folding panel, which for example comprises an IR opacifier. Thin layers and multiple layers of vacuum insulation panel 6 can be employed.

Preferably, the layer of a vacuum insulation panel 6 and the at least one layer of a particle foam, such as in particular expanded polypropylene (EPP), are joined to each other, which can be realized for example by foaming-in or insertion during production.

Figure 5:
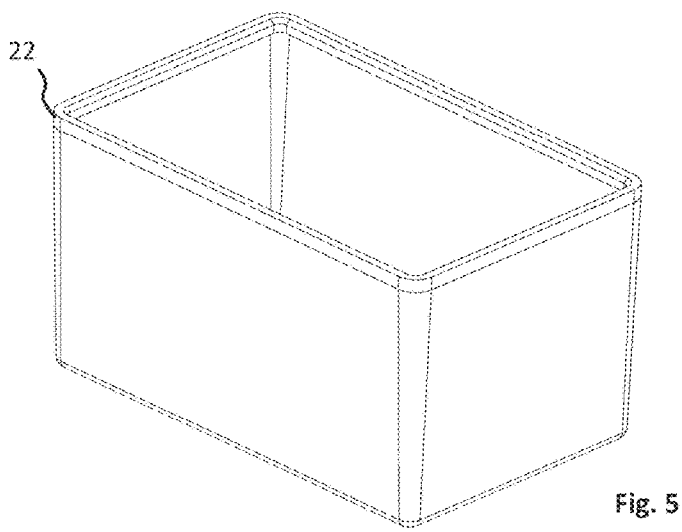
FIG. 5 shows a schematic perspective view of a layer of a particle foam, such as in particular expanded polypropylene (EPP), which is an outer trough.

For this purpose, the inner trough 21 from FIG. 3 was inserted into the outer trough 22 from FIG. 5 so that the vacuum insulation panel is surrounded by the two layers of a particle foam, such as in particular expanded polypropylene (EPP) 22, 21 or is joined to the same in such a way that the vacuum insulation panel is foamed-in at least in sections with the particle foam, such as in particular expanded polypropylene (EPP).

Figure 6:
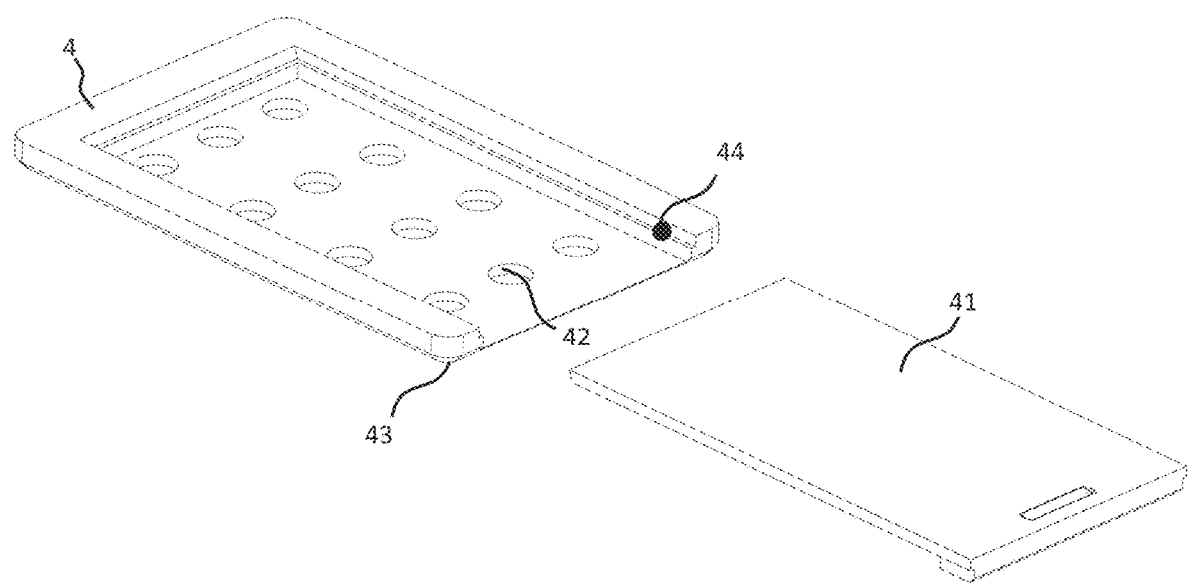
FIG. 6 shows a schematic perspective view of a lid for the insert container from FIG. 1.

The insert container further comprises a lid 4, as shown in FIG. 6, which can be opened at least in sections by a sliding element 41 in such a way that a compartment (with openings 42) being open in sections for dry ice sheets or an alternative PCM material is formed. The lid 4 comprises a projection 44 which is arranged in such a way to prevent it from being pulled out completely. Advantageously, the lid 4 includes an inclined bearing surface 43.

What is claimed is:

1. Insert container for a shipment carrier, which insert container comprises at least one side wall and a bottom which enclose a receiving space which can be closed with a lid, the at least one side wall and/or the bottom having a multilayer wall structure comprising at least one layer of at least one vacuum insulation panel and at least, one layer of a particle foam comprising expanded polypropylene (EPP), wherein the at least one layer of particle foam is formed at each point with a thickness in the range from 2 mm to 12 mm, and wherein the at least one layer of at least one vacuum insulation panel is foamed-in between a first, layer of particle foam and a second layer of particle foam.

2. Insert container according to claim 1, wherein the at least one layer of expanded polypropylene (EPP) is formed in a surface portion of the side wall and/or the bottom and/or the lid in the range of 50% to 90% of the total surface area with a thickness in the range of 2 mm to 12 mm.

3. Insert container according to claim 1, wherein the at least one layer is formed of expanded polypropylene (EPP) with a thickness in the range of 5 mm to 10 mm.

4. Insert container according to claim 1, wherein the layer of a vacuum insulation panel has a thickness in the range of 5 mm to 30 mm.

5. Insert container according to claim 4, wherein the layer of a vacuum insulation panel has a thickness in the range of 5 mm to 12 mm.

6. Insert container according to claim 1, wherein the layer of a vacuum insulation panel comprises a single-piece folding panel.

7. Insert container according to claim 1, wherein the layer of a vacuum insulation panel comprises an IR opacifier.

8. Insert container according to claim 1, wherein the layer of a vacuum insulation panel and the at least one layer of expanded polypropylene (EPP) are integrally joined to each other.

9. Insert container according to claim 8, wherein the layer of a vacuum insulation panel and the at least one layer of expanded polypropylene (EPP) are joined to each other in such a way that the vacuum insulation panel is foamed-in at least in sections with the expanded polypropylene (EPP).

10. Insert container according to claim 8, wherein the layer of a vacuum insulation panel is completely foamed-in by a first layer of expanded polypropylene (EPP) and a second layer of expanded polypropylene (EPP).

11. Insert container according to claim 1, further comprising a lid for closing the receiving space, which has a multilayer wall structure comprising at least one layer of at least one vacuum insulation panel and at least one layer of expanded polypropylene (EPP), and wherein the at least one layer of expanded polypropylene (EPP) is formed at each point with a thickness in the range of 2 mm to 12 mm.

12. Insert container according to claim 11, wherein the lid can be opened at least in sections by a sliding element in such a way that a compartment being open in sections for dry ice is formed.

13. Insert container according to claim 11, wherein the lid comprises a projection arranged in such a way to prevent it from being pulled out completely.

14. Insert container according to claim 11, wherein the lid has an inclined bearing surface.

15. Transport container comprising an insert container according to claim 1.

* * * * *